United States Patent [19]
Bauer et al.

[11] Patent Number: 5,689,734
[45] Date of Patent: Nov. 18, 1997

[54] PRESSURIZED CAMERA SYSTEM

[75] Inventors: James A. Bauer, Hampton; George F. Dailey, Plum Borough; Edward J. Hyp, Irwin, all of Pa.

[73] Assignee: Westinghouse Electric Corporation, Pittsburgh, Pa.

[21] Appl. No.: 703,319

[22] Filed: Aug. 26, 1996

[51] Int. Cl.⁶ .......................... G03B 17/08; G03B 17/00
[52] U.S. Cl. ................. 396/28; 396/71; 396/267; 348/82
[58] Field of Search .................... 396/25–29, 71, 396/267, 432; 348/82, 83, 84, 85

[56] References Cited

U.S. PATENT DOCUMENTS

| | | | |
|---|---|---|---|
| 3,609,236 | 9/1971 | Heilman | 178/7.92 |
| 3,780,220 | 12/1973 | Fugitt et al. | 178/6.8 |
| 3,838,434 | 9/1974 | Hughes et al. | 354/64 |
| 4,204,528 | 5/1980 | Termanini | 128/6 |
| 4,491,865 | 1/1985 | Danna et al. | |
| 4,536,789 | 8/1985 | Bains | 358/99 |
| 4,561,429 | 12/1985 | Sato et al. | 128/6 |
| 4,697,576 | 10/1987 | Krauter | |
| 4,853,722 | 8/1989 | Gell, Jr. | 354/64 |
| 4,857,261 | 8/1989 | Marshall et al. | 376/248 |
| 4,965,601 | 10/1990 | Canty | |
| 4,974,497 | 12/1990 | Krauter | |
| 4,991,006 | 2/1991 | Wood | 358/100 |
| 5,107,286 | 4/1992 | Sergeant et al. | |
| 5,111,222 | 5/1992 | Hayakawa et al. | |
| 5,159,366 | 10/1992 | Gell, Jr. | |
| 5,275,038 | 1/1994 | Sizer et al. | 73/151 |
| 5,323,899 | 6/1994 | Strom et al. | |
| 5,347,989 | 9/1994 | Monroe et al. | |
| 5,351,830 | 10/1994 | Bender et al. | |
| 5,394,208 | 2/1995 | Campbell | 354/75 |
| 5,438,265 | 8/1995 | Eslambolchi et al. | 324/326 |

OTHER PUBLICATIONS

"The Guide to Video Technology for Remote Visual Inspection", published by Welch Allyn, Inspection Systems Division.

*Primary Examiner*—Safet Metjahic
*Assistant Examiner*—John Chizmar

[57] ABSTRACT

Camera system for viewing an object located in a region of contamination (e.g., oil, water, particulate matter, or the like). The system is capable of being internally pressurized above ambient pressure, so that the contamination is prevented from entering the camera system to foul the camera. The system includes a housing having an interior and a view port. An electronic sensor is disposed in the housing opposite the port for sensing the object and for generating an electrical output signal that travels along a conductor connected to the sensor. A processor is connected to the conductor for amplifying the output signal. The amplified signal is received by a display monitor which displays an image of the object. The system further includes a quick-disconnect connector which interconnects the housing to a source of pressurized fluid used to pressurize the housing above ambient pressure.

3 Claims, 5 Drawing Sheets

PRESSURIZED CAMERA SYSTEM

BACKGROUND OF THE INVENTION

This invention generally relates to cameras and more particularly relates to a pressurized camera system for remotely viewing an object located in a region of contamination (e.g., oil, water, particulate matter, or the like). The system is capable of being internally pressurized above ambient pressure, so that the contamination is prevented from entering the camera system to foul the camera's internals.

Miniature cameras, borescopes or endoscopes are used to inspect objects that are relatively inaccessible due to structural interference or for safety reasons. For example, such cameras are remotely inserted into radioactive nuclear heat exchangers to safely inspect heat transfer tubes for cracks. Such cameras are also inserted into steam turbines to inspect the complex geometry of closely-spaced turbine blades for cracks. However, the portion of the tube or blade to be inspected may lay underwater, in a body of oil, or in an atmosphere containing fine particulate matter. Leaking of water, oil or particulate matter into the camera may contaminate and foul the camera's internals which includes the camera's sensitive imaging sensor. Fouling of the camera's imaging sensor, particularly the type of sensor that is an electronic "Charged-Coupled Device" (CCD) computer chip having light-sensitive pixels thereon, severely compromises picture quality and often necessitates replacement of the sensor. Repair and decontamination of fouled cameras is time-consuming and costly and replacement of the sensor may cost thousands of dollars.

A common prior art technique to prevent fouling of camera internals is to use a sealant, such as epoxy, around joints and lens apertures to prevent ingress of contaminants into the interior of the camera. However, applicants have discovered that use of a sealant, such as epoxy, around joints and lens apertures to prevent ingress of contaminants into the interior of the camera has not proved completely satisfactory because the sealant embrittles and cracks, thus leading to leaking after extended use. Therefore, a problem in the art is to prevent ingress of contaminants into the camera in a manner not relying on the use of sealants to seal the camera.

Another prior art technique for preventing contamination of camera internals is to use positive pressure to prevent ingress of contaminants into the camera. One such device to achieve this result is disclosed in U.S. Pat. No. 5,159,366 titled "Underwater Housing And Pressure Compensation Method And Apparatus" issued Oct. 27, 1992 to Gell, Jr. This patent discloses a flexible underwater housing, which may contain a camera. The water-proof housing is maintained at positive pressure. However, although the housing is pressurized, the camera itself does not appear to be pressurized. Thus, a breach in the wall of the flexible housing may allow unwanted water to enter the camera to foul the camera's internals.

A positively pressurized camera is disclosed in U.S. Pat. No. 5,107,286 titled "Environmentally Sealed Camera Housing" issued Apr. 21, 1992 to Sergeant, et al. This patent discloses a device that eliminates the danger that the pressurized housing will propel parts away from it when the pressurized housing is opened. Although this patent discloses a positively pressurized camera housing, this patent does not appear to disclose a pressurized camera of suitable configuration for safely remotely inspecting structures of complex geometry.

Therefore, what is needed is a camera capable of safely inspecting complex structures located in a contaminated environment in a manner such that the camera internals are not fouled by the contaminants.

SUMMARY OF INVENTION

Disclosed herein is a camera system for remotely viewing an object located in a region of contamination (e.g., oil, water, particulate matter, or the like). The system is capable of being internally pressurized above ambient pressure, so that the contamination is prevented from entering the camera system to foul the camera's internals. The system includes a housing having an interior and a view port. An electronic sensor is disposed in the housing opposite the view port for sensing the object and for generating an electrical output signal in response to the object sensed thereby. The output signal travels along a conductor connected to the sensor. A processor is connected to the conductor for amplifying the output signal. The amplified signal is received by a display monitor which displays an image of the object. The system further includes a quick-disconnect connector which interconnects the housing to a source of pressurized fluid used to pressurize the housing above ambient pressure.

In its broad form, the invention is a pressurized camera system for viewing an object, comprising a housing having an interior and a view port; imaging means in optical communication with the view port for viewing the object through the view port and for generating an image of the object; pressurizing means in communication with the interior of said housing for pressurizing the interior of said housing above ambient pressure to prevent contamination from entering the interior of said housing; manipulation means connected to said housing for manipulating said housing about the object; and connector means interposed between said pressurizing means and said housing for interconnecting said pressurizing means and said housing.

An object of the present invention is to provide a camera system for viewing an object located in a region of contamination (e.g., oil, water, particulate matter, or the like) without the camera internals becoming fouled by the contamination.

A feature of the present invention is the provision of means for pressurizing a camera housing above ambient pressure to prevent ingress of contaminants into the housing in combination with a removable quick-disconnect connector interconnecting the housing with a source of pressurized fluid used to pressurize the camera housing.

An advantage of the present invention is that the camera may be used in a region of contamination without fouling of the camera's internals because the contaminants water, in oil, fine particulate matter or the like) are prevented from entering the camera as the camera is pressurized above ambient pressure.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description taken in conjunction with the accompanying drawings wherein:

DETAILED DESCRIPTION OF THE INVENTION

Figure 1:
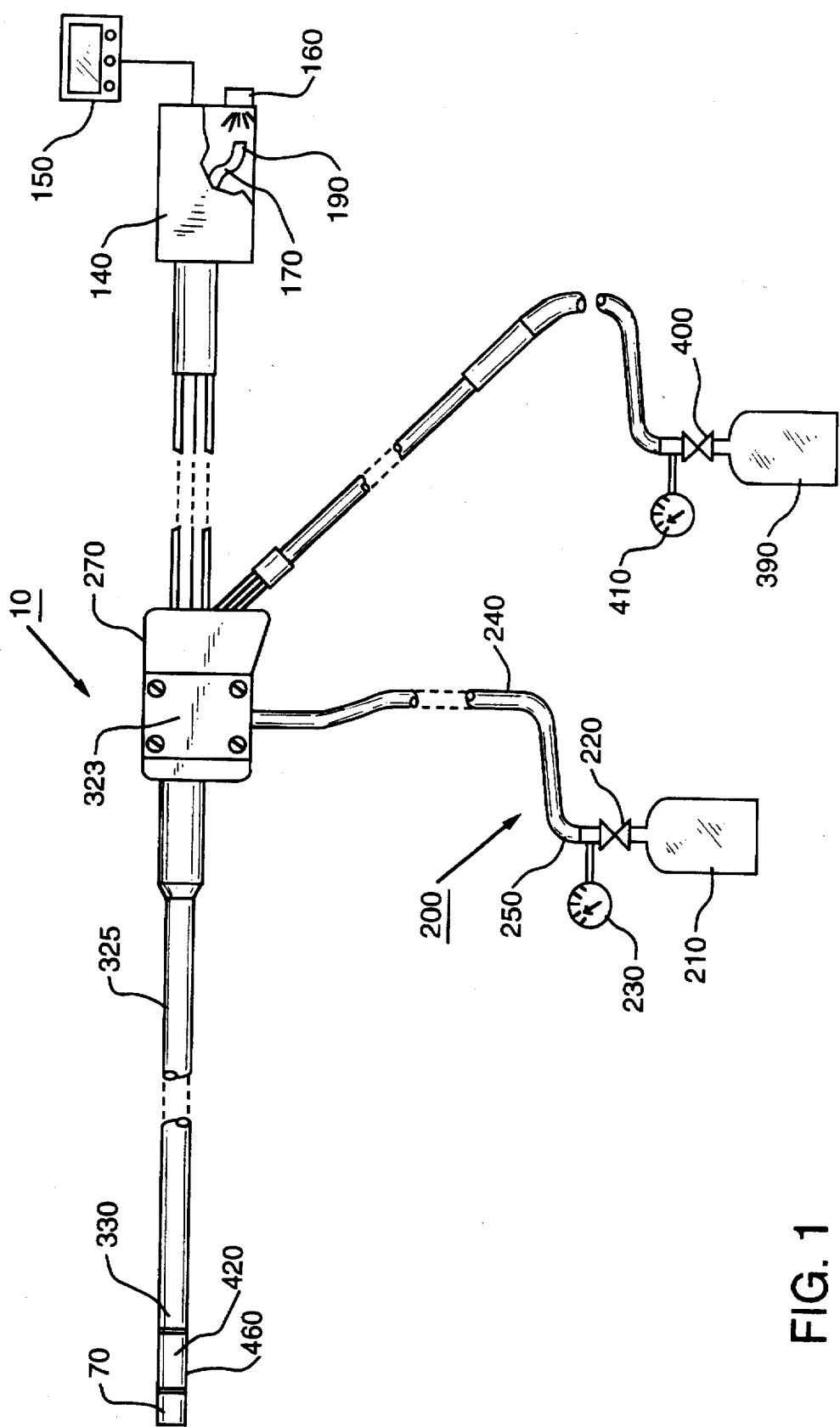
FIG. 1 is a view in elevation of a pressurized camera system belonging to the invention.
Figure 2:
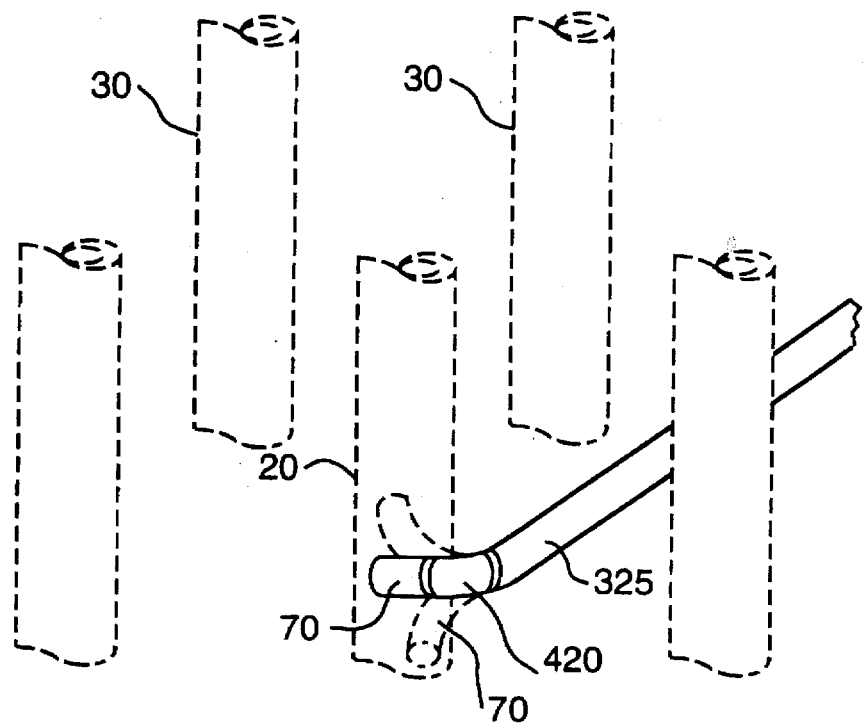
FIG. 2 is a fragmented view in perspective of the invention remotely and safely inspecting a plurality of closely-spaced nuclear heat exchanger heat transfer tubes that are shown in phantom.
Figure 3:
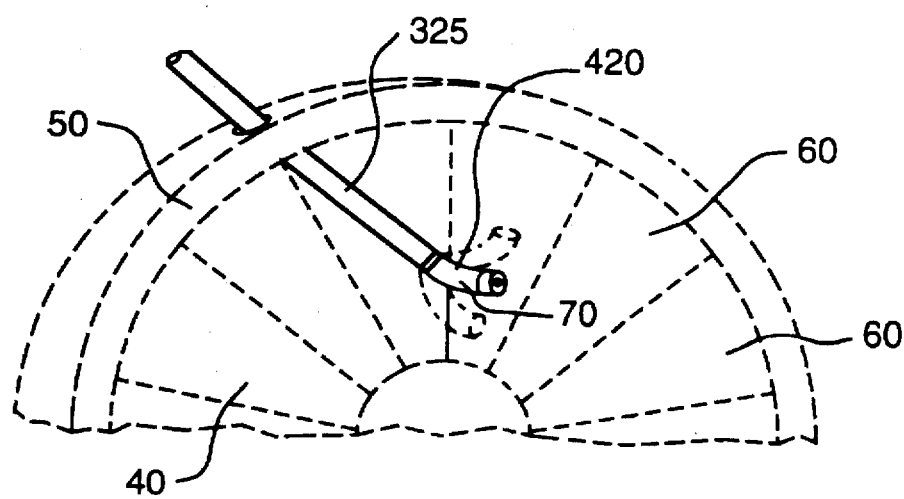
FIG. 3 is a fragmented view in perspective of the invention inspecting a plurality of closely-spaced steam turbine blades of complex geometry, the turbine blades being shown in phantom.

Referring to FIGS. 1, 2 and 3, there is shown the subject matter of the present invention, which is a pressurized camera system, generally referred to as 10, for remotely viewing an object. Such an object may be, for example, an individual nuclear heat exchanger heat transfer tube 20 belonging to a field of closely-spaced heat transfer tubes 30. Alternatively, such an object may be an individual steam turbine blade 40 belonging to a rotor 50 containing a plurality of closely-spaced turbine blades 60 of complex geometry. Although camera system 10 is adapted to remotely inspect tube 20 and blade 40 for cracks, it will be understood that camera system 10 is also capable of remotely inspecting any object or structure for any purpose.

Figure 4:
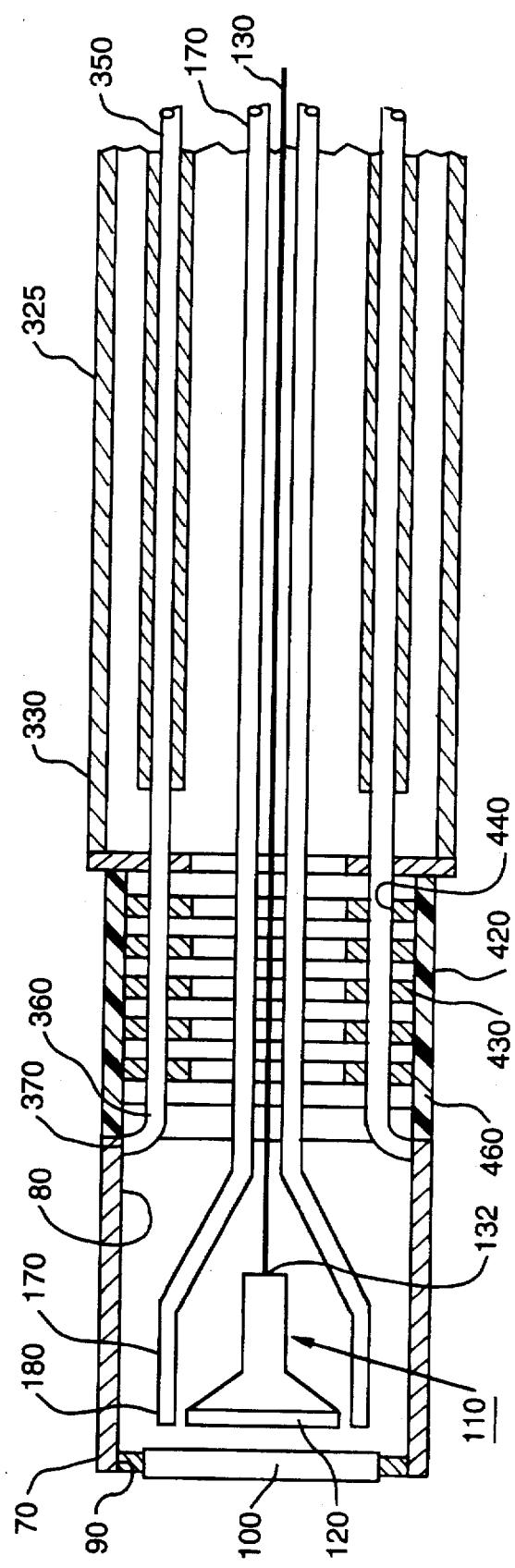
FIG. 4 is a view in vertical section of a positioning tube adapted to position a camera housing adjacent the heat transfer tube or turbine blade to be inspected.

Referring to FIGS. 1 and 4, pressurized camera system 10 comprises a generally cylindrical housing 70 having an interior 80 and a view port 90 covered by a transparent lens member 100, which may be mar-resistant glass or plastic. In optical communication with view port 90 is imaging means 110 capable of viewing the object 20/40 through view port 90 and generating an image of object 20/40, as described in more detail presently. In this regard, imaging means 110 comprises sensor means, such as an electronic "Charged-Coupled Device" (CCD) sensor 120, disposed in housing 70 for electronically sensing light reflected from object 20/40 and for generating an electrical output signal in response to the reflected light sensed by sensor 120. Attached to sensor 120 is conductor means, such as an elongate electrical wire conductor 130, for conducting the output signal therealong. Conductor 130 has a first end 132 thereof attached to sensor 120 and a second end 134 attached to processor means, such as an electronic processor 140. Processor 140 receives, processes and amplifies the output signal and generates an amplified electrical signal. Electrically connected to processor 140 is display means, such as a video display monitor 150, for displaying an image of object 20/40. More specifically, monitor 150 receives the amplified signal from processor 140 and converts the amplified signal into a image of object 20/40. Moreover, connected to processor 140 is a light source 160 capable of generating light, for reasons disclosed presently. In optical communication with light source 160 is light guide means, which may be at least one elongate fiber-optic cable or light guide 170, for illuminating object 20/40, as described more fully presently. Light guide 170 has a first end 180 aligned with view port 90 for illuminating object 20/40 and a second end 190 in optical communication with light source 160. There may be a plurality of light guides 170 defining a fiber-optic bundle, the plurality of light guides 170 having first ends 180 surrounding the peripheral edge of sensor 120 and aligned with view port 90 in order to cast abundant light through view port 90 and onto object 20/40. It will be appreciated from the description hereinabove, that the light generated by light source 160 enters second end 190, travels the length of elongate fiber-optic light guide 170, exits first end 180 and thereafter passes through transparent lens member 100 to illuminate object 20/40. The light illuminating object 20/40 is reflected by object 20/40 and returns through transparent lens member 100, which focuses the image onto sensor 120. Sensor 120 electronically senses the reflected light and generates an electronic output signal which travels the length of conductor 130 to be received by processor 140. Processor 140 processes and amplifies the output signal and produces an amplified signal which is received by monitor 150. Monitor 150 in turn generates an image of object 20/40 that is viewable by the operator of system 10.

Referring to FIGS. 1, 5, 6 and 7, pressurized camera system 10 further comprises pressurizing means, generally referred to as 200, in fluid communication with interior 80 of housing 70 for pressurizing housing 70 above ambient pressure. Pressurizing interior 80 prevents contaminants from entering interior 80. Pressurizing means 200 includes first pressurized fluid supply means, such as a first pressurized fluid supply 210, for supplying a first pressurized fluid (e.g., such as air or nitrogen or the like) into interior 80 of housing 70. It will be appreciated by those skilled in the art, that the desired pressure of the pressurized fluid will depend on the ambient pressure. For example, if housing 70 is disposed under four feet of water, the pressurized fluid may be pressurized to a pressure of approximately 20 psia to ensure that water will not leak into housing 70.

Still referring to FIGS. 1, 5, 6 and 7, connected to first fluid supply 210 may be a first regulator valve 220 and associated first regulator gauge 230 for regulating the pressure of the first fluid drawn from first pressurized fluid supply 210. Moreover, a flexible first conduit 240 has a first end 250 connected to first fluid supply 210 for conducting the first pressurized fluid through first conduit 240. The second end 260 of first conduit 240 is connected to a removable quick-disconnect connector 270.

Referring again to FIGS. 1, 5, 6 and 7, connector 270 defines a first bore 280 for receiving the second end 260 of first conduit 240. First bore 280 opens onto a centrally disposed internal chamber 290 defined by connector 270, for reasons disclosed hereinbelow. In communication with chamber 290 is a second bore 300 coaxially aligned with a third bore 310, for reasons disclosed hereinbelow. Moreover, in communication with chamber 290 is a fourth bore 320, for reasons disclosed hereinbelow. A first sealing member 321a and a second sealing member 321b may be sealingly disposed in third bore 310 and fourth bore 320, respectively, to ensure that the first pressurized fluid flows generally in the direction of the arrows shown in FIG. 5. Indeed, this configuration of connector 270 defines a flow path therethrough for passage of the first pressurized fluid, the flow path being generally illustrated in FIG. 5 by arrows. Formed in a wall of connector 270 is an opening 322 adapted to be covered by a removable cover plate 323, which may be removably connected to connector 270 by a plurality of screws 324. Opening 322 and associated cover plate 323 allow access to chamber 290. It is important that connector 270 be provided. This is important because connector 270 provides a convenient means to pressurize housing 70. Pressurizing housing 70 avoids reliance on use of sealants, such as epoxy, which may crack and leak after extended use. Moreover, it is important that connector 270 be a quick-disconnect connector in the sense that first conduit 240 may be quickly connected to and disconnected from first bore 280. This is so because first conduit 240 is held within first bore 280 by a slip fit. This is important in order to allow system 10 to be quickly connected and disconnected to an on-site supply of pressurized fluid.

Figure 5:
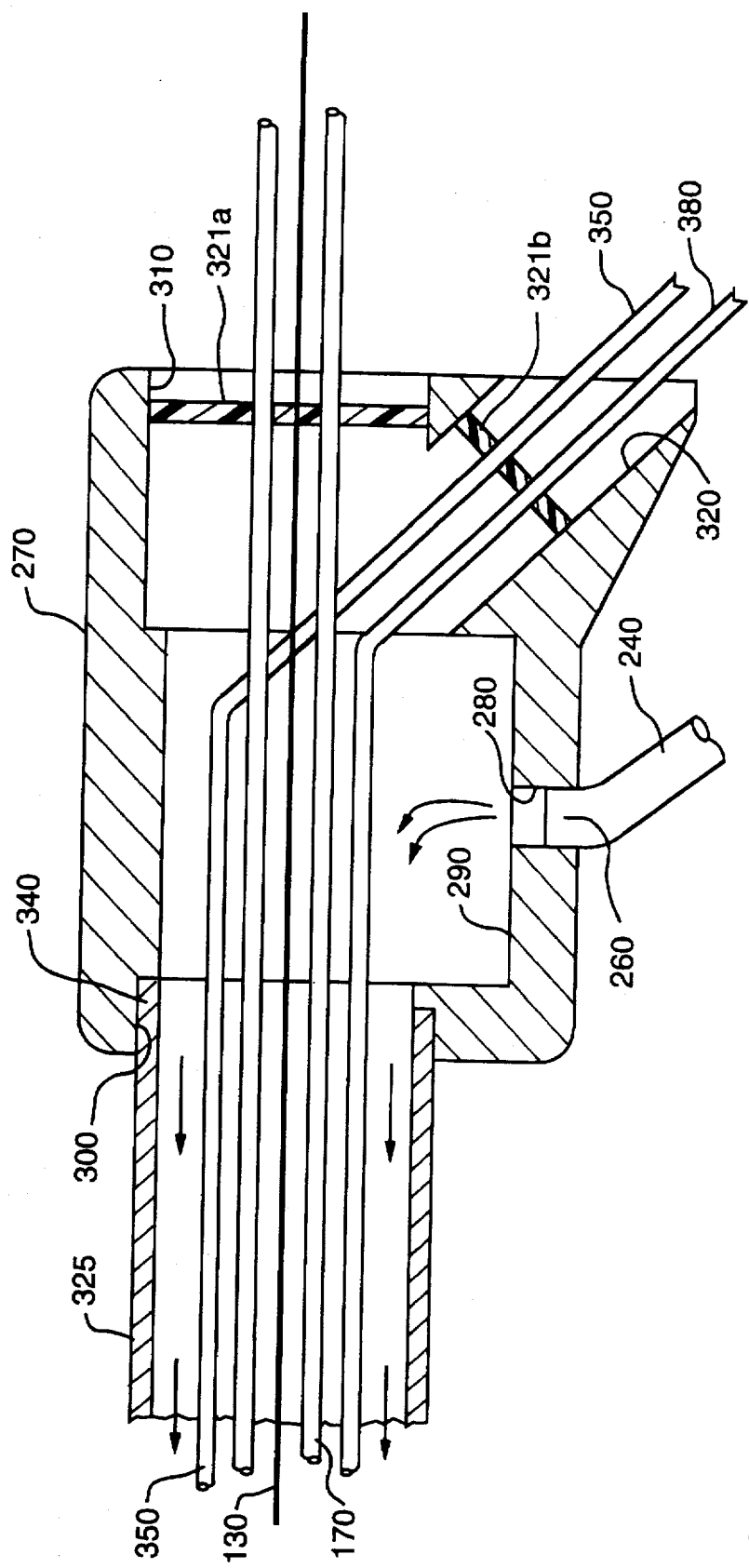
FIG. 5 is a view in partial vertical section of a Y-shaped junction enclosed by a removable quick-disconnect connector.
Figure 6:
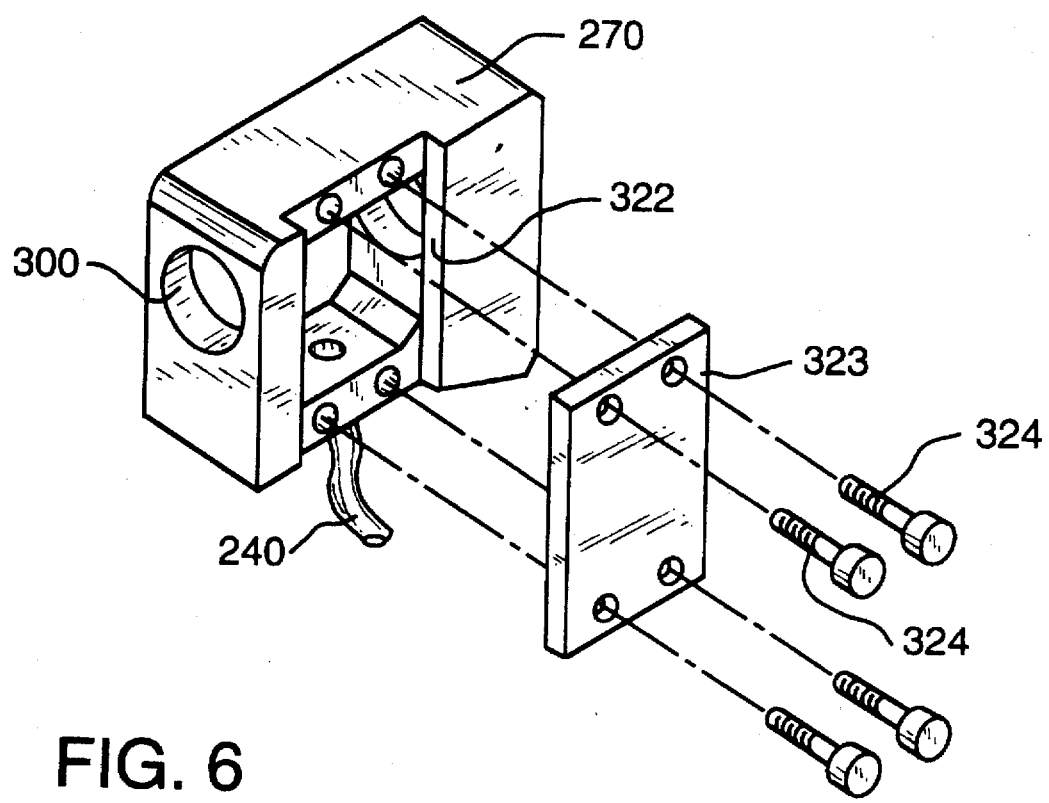
FIG. 6 is an exploded view in perspective of the connector without the Y-shaped junction enclosed therein.
Figure 7:
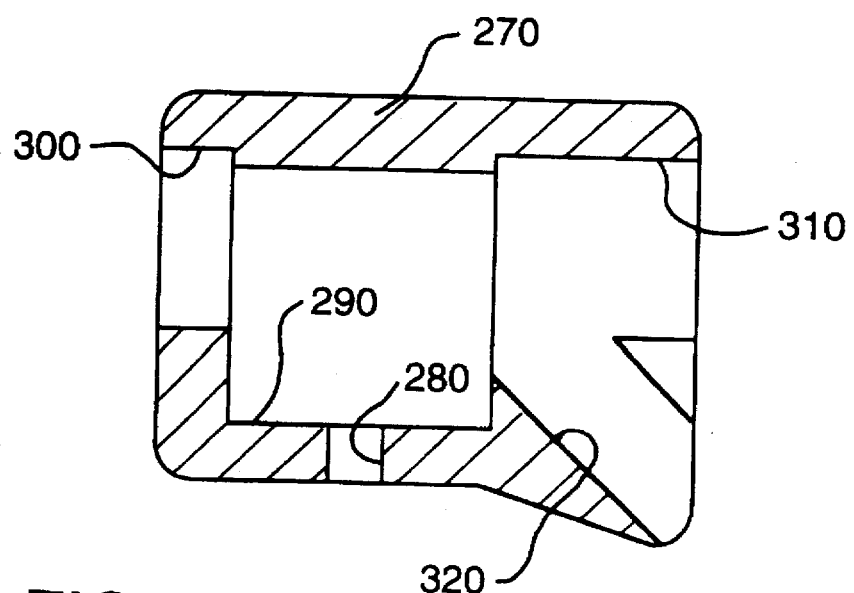
FIG. 7 is a view in vertical section of the connector without the Y-shaped junction enclosed therein.

Referring yet again to FIGS. 1, 5, 6 and 7, a substantially rigid positioning tube 325 of predetermined length to allow remote inspection of object 20/40 has a first end 330 connected to housing 70 and a second end 340 sealingly affixed in second bore 300. Positioning tube 325 assists in remotely positioning or maneuvering housing 70 to a location near object 20/40. As best seen in FIG. 5, the previously mentioned light guide 170 extends through positioning tube 325 and passes through chamber 290 and third bore 310.

Thus, it will be understood from the discussion hereinabove, that first pressurized fluid supply 210 supplies the first pressurized fluid at a predetermined pressure into first conduit 240, then into chamber 290, then through second bore 300 and thence along the interior of positioning tube 325 on its way to housing 70 in order to pressurize housing 70.

Referring to FIGS. 1, 4 and 5, manipulation means is connected to housing 70 for manipulating or articulating housing 70 about object 20/40 in order to satisfactorily view object 20/40 after positioning tube 325 remotely positions housing 70 near object 20/40. As disclosed in detail presently, the manipulation means is capable of manipulating, articulating and rotating housing 70 about the longitudinal axis of positioning tube 325. In this regard, the manipulation means comprises a flexible, radially inflatable second conduit 350 having a first end 360 attached to a rear off-center portion of housing 70, such as at rear location 370. Moreover, second conduit 350 extends through positioning tube 325 and connector 270. In this regard, second conduit 350 passes through chamber 290 and fourth bore 320. Second conduit 350 has a second end 380 in fluid communication with second pressurized fluid supply means, such as a second pressurized fluid supply 390, for supplying a second pressurized fluid into second conduit 350 to radially inflate or expand second conduit 350. As described in detail hereinbelow, second conduit 350 axially shortens as it radially inflates for rotating housing 70 in order to satisfactorily view portions of object 20/40. Conversely, when second conduit 350 is depressurized, it radially contracts and thereby axially lengthens to its original length prior to pressurization. Interposed between second pressurized fluid supply 390 and second end 380 of second conduit 350 is a second regulator valve 400 and associated second regulator gauge 410. Valve 400 and gauge 410 regulates the pressure of the second pressurized fluid drawn from second pressurized fluid supply 390. Valve 400 is also preferably capable of regulating the depressurization of second conduit 350. There are preferably a plurality of second conduits 350 having first ends 360 spaced-apart in a circular pattern around the rear portion of housing 70. Each second conduit 350 is capable of being selectively pressurized and depressurized by means of valve 400 and regulator 410 in order to suitably manipulate, articulate and rotate housing 70.

As best seen in FIG. 4, interposed between housing 70 and positioning tube 325 is a flex-joint 420 for allowing precise manipulation, articulation and rotation of housing 70. In this regard, flex-joint 420 comprises a plurality of axially aligned ribs or disks 430, each disk 430 having a plurality of transverse off-center holes 440 therethrough for passage of second conduits 350 and a centrally disposed hole 450 for passage of light-guide 170 and conductor 130. Sealingly surrounding the plurality of disks 430 is a flexible cover or sheath 460 for protecting disks 430 from near-by contamination. When any one of the second conduits 350 radially inflates, it will shorten and exert a pulling force on the rear portion of housing 70 at location 370. Disks 430 will tend to articulate rearwardly as second conduit 350 shortens, thereby manipulating, articulating and rotating housing 70 in the rearwardly direction. In this manner, housing 70 and sensor 120 disposed therein are capable of being controllably moved to view desired portions of object 20/40.

It will be appreciated from the description hereinabove, that an advantage of the present invention is that housing 70 is capable of being pressurized above ambient pressure in order to prevent ingress of contamination into housing 70 that would otherwise foul video chip/lens 120. To achieve this result, connector 270 can be quickly connected to first pressurized fluid supply 210 and to positioning tube 325 for allowing pressurized fluid to enter positioning tube 325 and from there into housing 70 to pressurize housing 70.

Although the invention is illustrated and described herein in its preferred embodiment, it is not intended that the invention as illustrated and described be limited to the details shown, because various modifications may be obtained with respect to the invention without departing from the spirit of the invention or the scope of equivalents thereof. For example, the invention is described herein for remotely inspecting nuclear heat exchanger heat transfer tubes and the complex geometry of steam turbine blades disposed in a contaminated region. However, the invention is also suitable for viewing any object disposed in a contaminated region having structural interference or where remotely viewing the object at a safe distance is of concern.

Therefore, what is provided is a pressurized camera system for viewing an object located in a region of contamination.

What is claimed is:

1. A pressurized camera system for viewing an object, comprising:

a housing having an interior and a view port;

imaging means disposed in the interior of said housing and in optical communication with the view port for viewing the object through the view port and for generating an image of the object;

pressurizing means in communication with the interior of said housing for pressurizing the interior of said housing above ambient pressure to prevent contamination from entering the interior of said housing; said pressurizing means including:

(a) first pressurized fluid supply means for supplying a first pressurized fluid into the interior of said housing;

(b) a first conduit having a first end and a second end, the first end of said first conduit connected to said first pressurized fluid supply means for conducting the first pressurized fluid through said first conduit;

(c) a positioning tube having a first end and a second end, the first end of said positioning tube attached to said housing for positioning said housing near the object; and (d) connector means attached to said second end of said positioning tube and removably interconnected with said second end of said first conduit for connecting and disconnecting said first pressurized fluid supply means and said positioning tube.

2. The pressurized camera system of claim 1, wherein said imaging means comprises:
   (a) sensor means disposed in said housing for sensing the object and for generating an output signal in response to the object sensed thereby;
   (b) conductor means attached to said sensor for conducting the output signal therealong;
   (c) processor means attached to said conductor means for processing and amplifying the output signal to generate an amplified signal;
   (d) display means connected to said processor means for receiving the amplified signal, so that an image of the object is displayed;
   (e) a light source associated with said sensor means and capable of generating light; and
   (f) light guide means in optical communication with said light source for illuminating the object, whereby the light is conducted from said light source, through said light guide means and onto the object to illuminate the object; and
   wherein said conductor means and said light guide means extends through said connecting means and said connecting means has a seal member engaged with said conductor means and said light guide means.

3. A pressurized camera system for viewing an object, comprising:
   (a) a housing having an interior and a view port;
   (b) an electronic sensor disposed in said housing and in communication with the port for electronically sensing the object and for generating an electrical output signal in response to the object sensed thereby;
   (c) an elongate electrical conductor having a first end thereof attached to said sensor for conducting the output signal therealong, said conductor having a second end;
   (d) an electronic processor attached to the second end of said conductor for processing and amplifying the output signal to generate an amplified signal; and
   (e) a display monitor electrically connected to said processor for receiving the amplified signal, so that an image of the object is displayed;
   (f) an elongate fiber-optic light guide having a first end thereof disposed in optical communication with the view port for illuminating the object, said light guide having a second end;
   (g) a light source in optical communication with the second end of said light guide, whereby the light is conducted from said light source, through said light guide and onto the object to illuminate the object;
   (h) pressurizing means in communication with the interior of said housing for pressurizing the interior of said housing above ambient pressure to prevent contamination from entering the interior of said housing, said pressurizing means including:
      (i) a first pressurized fluid supply for supplying a first pressurized fluid into the interior of said housing;
      (ii) a first conduit having a first end and a second end, the first end of said first conduit connected to said first pressurized fluid supply means for conducting the first pressurized fluid therethrough;
      (iii) a positioning tube having a first end and a second end, the first end of said positioning tube attached to said housing for positioning said housing means the object; and
      (iv) a removable quick-disconnect connector interconnecting the second end of said first conduit and the second end of said positioning tube, said connector defining a fluid flow path therethrough for passage of the fluid from said first conduit and into said positioning tube.

* * * * *